(12) United States Patent
Krohn et al.

(10) Patent No.: US 7,340,459 B2
(45) Date of Patent: Mar. 4, 2008

(54) INFORMATION ACCESS

(75) Inventors: Uwe Krohn, Suffolk (GB); Nicholas J Davies, Colchester (GB); Richard Weeks, Suffolk (GB)

(73) Assignee: British Telecommunications public limited company, London (GB)

( * ) Notice: Subject to any disclaimer, the term of this patent is extended or adjusted under 35 U.S.C. 154(b) by 877 days.

(21) Appl. No.: 10/380,068

(22) PCT Filed: Sep. 24, 2001

(86) PCT No.: PCT/GB01/04248

§ 371 (c)(1),
(2), (4) Date: Mar. 12, 2003

(87) PCT Pub. No.: WO02/27544

PCT Pub. Date: Apr. 4, 2002

(65) Prior Publication Data

US 2004/0006740 A1  Jan. 8, 2004

(30) Foreign Application Priority Data

Sep. 29, 2000 (GB) ................................. 0023938.4

(51) Int. Cl.
*G06F 17/30* (2006.01)

(52) U.S. Cl. ............ 707/5; 707/E17.123; 707/E17.127

(58) Field of Classification Search .................... 704/7, 704/10; 707/5, E17.123, E17.127
See application file for complete search history.

(56) References Cited

U.S. PATENT DOCUMENTS 6,182,068 B1 * 1/2001 Culliss ........................... 707/5
7,039,860 B1 * 5/2006 Gautestad .................... 715/513

* cited by examiner

*Primary Examiner*—David Hudspeth
*Assistant Examiner*—Samuel G Neway
(74) *Attorney, Agent, or Firm*—Nixon & Vanderhye P.C.

(57) ABSTRACT

According to the present invention, apparatus and methods are provided to enable a user to locate and retrieve sets of information relevant to search criteria specified in a search query submitted by the user. Search results include not only a list of information sets matching with the search criteria, but also the preserved structure of any tags used in annotating the information set according to a structured mark-up language such as XML. A user may select a tag from a presented list of the returned tag structures, and the apparatus lists those documents containing the selected tags. The list of tags is then adjusted to include the selected tag and any other of the returned tags contained in the listed documents. Further tag selection from the adjusted list leads to a further refinement of the listed documents, enabling the user to navigate the search results on the basis of tag information.

6 Claims, 3 Drawing Sheets

INFORMATION ACCESS

BACKGROUND

1. Technical Field

This invention relates to information access and finds particular application in locating information contained in documents that have been annotated using a structured markup language.

2. Related Art

To assist in locating information stored, for example, in a computer-based distributed file store, search engines of various types have been implemented in software to assist with identifying data sets that contain information of at least some relevance to a user's search criteria. To assist with information location, search engines are often able to make use of already constructed indexes to particular fields or domains of information, or to exploit summary or keyword data stored within data sets themselves.

However, it is often necessary for a search engine to analyse the contents of a data set to try to determine it's primary information content and to assess the relevance of that information to the user's requirements. This is a more or less difficult task, according to the way the information is presented and structured.

In the context of a distributed information store such as that provided by the Wordwide Web (known as the "web"), a markup language has been developed and standardised to improve identification and access to information contained in web pages. The Hypertext Markup Language (HTML) used to annotate web pages includes a <META> tag for use in identifying a list of keywords provided by the web page author and indicative of the information content of the web page. Search engines may search for a <META> tag within a web page and compare any associated keywords with a user's search criteria to determine whether or not the information in the page is likely to be relevant.

More recently, a mark-up language called extensible Markup Language (XML) has been developed to provide a more flexible and structured means for annotating information. One of the biggest potential benefits of XML is its ability to improve the accuracy of searches through the millions of documents now stored on intranets and the Internet. Exploitation of meta-information provided by XML tagging has the potential to dramatically reduce the number of irrelevant hits returned compared with current HTML-based search engines. However, whereas all tags within the HTML markup language are standardised, XML tags are, but for a small core of standard tags, entirely user-definable. To some extent, the usefulness of XML tagging is therefore subject to the skills of a document author. However, XML does allow user communities, from industry groups to single users, to develop an individual mark-up language that best suits their needs. In order to coordinate proposals for XML standards, in e-commerce applications for example, the Organisation for the Advancement of Structured Information Standards (OASIS) has created the Web Portal "XML.org".

A known XML search engine such as "GoXML" provides a largely conventional keyword-based search facility to locate relevant information in conventional web pages as well as XML tagged documents. Where XML documents are located in a search, GoXML compiles and presents a flat list of the tags that mark up document parts within which search keywords were found, together with a conventional list of references to those documents. The user can then explore this list of "hit" tags by selecting a particular tag, causing the document list to be reduced to only those documents where a search keyword was found to occur in a part marked up by the selected tag. However, GoXML does not carry out further analysis of "hit" tags to enable a user to fully exploit the potential contextual information provided by those tags and to navigate the search results more effectively.

According to a first aspect of the present invention there is provided a method of accessing sets of information stored in an information system, wherein portions of said sets of information are enclosed by tags of a hierarchical tag structure defined according to a structured mark-up language, the method comprising the steps of:

(i) generating a search query comprising specified search criteria;

(ii) identifying portions of said sets of information matching said specified search criteria, and outputting a list of references to said identified sets of information;

(iii) identifying, for each matching portion identified at step (ii), an enclosing tag structure and outputting a list of said identified tag structures;

(iv) receiving a selection signal specifying a tag structure from the list output at step (iii);

(v) adjusting said list of references from step (ii) to comprise references only to said identified sets of information that contain the tag structure selected at step (iv);

(vi) adjusting said list of tag structures to comprise tag structures contained in information sets referenced in said adjusted list at step (v); and (vii) repeating step (iv) in respect of said adjusted list of tag structures, and step (v) to identify a more specific list of references to sets of information.

According to preferred embodiments of the present invention, apparatus and methods are provided to enable a user to locate and retrieve sets of information relevant to search criteria specified in a search query submitted by the user. In particular, as for all embodiments of the present invention, apparatus and methods are designed to enable the user to exploit contextual information provided within documents that have been annotated using tags defined according to a structured markup language such as XML. Besides locating portions of a document that appear to match the user's search criteria, embodiments of the present invention enable the user to use XML or other markup language tags, inserted into a document by the author, to help identify those documents from a potentially large set of search results that are most relevant to the original search query or, more particularly, to what the user hoped to find.

BRIEF SUMMARY

Embodiments of the present invention are largely concerned with analysis of search results, enabling a user to exploit contextual information provided by markup language annotations in documents identified in the search. Largely conventional search engines and search techniques may be used to obtain a set of search results on the basis of a user's search query. However, the otherwise conventional search engine or other information retrieval tool must be arranged to not only to locate portions of documents matching a user's search query, but also to identify and return annotating tags associated with those matching portions, according to the particular markup language used. In particular, the structure of annotating tags used in a particular structured markup language must be identified and returned in the search results, preserving that tag structure for analysis by novel and inventive features of the present invention, to be described in detail below.

Preferably, the method of said first aspect includes the steps of:

(viii) detecting, following receipt of the selection signal at step (iv), a request for access to a corresponding set of information listed in step (v);

(ix) updating, in respect of the tag structure selected at step (iv), a weighting value representative of the probability that selection of the tag structure led to a request for access to a corresponding set of information; and (x) outputting an ordered list of the tag structures identified at step (iii) according to their respective weighting values.

In this preferred embodiment, the method provides a further enhancement to the tag analysis process by monitoring, over a period of time, the selection of tags by users from each presented tag list and monitoring any subsequent access by a user of particular documents listed in the resultant reduced document lists. The apparatus records a history of tag selection by users in general, or by a particular user or group of users, and their subsequent document retrieval activity in respect of each distinct tag and/or tag structure. This historical data is then used to weight each of the distinct tags and tag structures according to likelihood that they resulted in a selection of documents relevant to those users. The apparatus is then able to present a given tag list in a ranking order of decreasing usefulness for example, when particular tags known from the historical records appear in a set of search results.

BRIEF DESCRIPTION OF THE DRAWINGS

There now follows, by way of example only, a detailed description of specific embodiments of the present invention. This description is to be read in conjunction with the accompanying drawings, of which.

OVERVIEW OF NON-LIMITING, EXEMPLARY EMBODIMENTS

Figure 1:
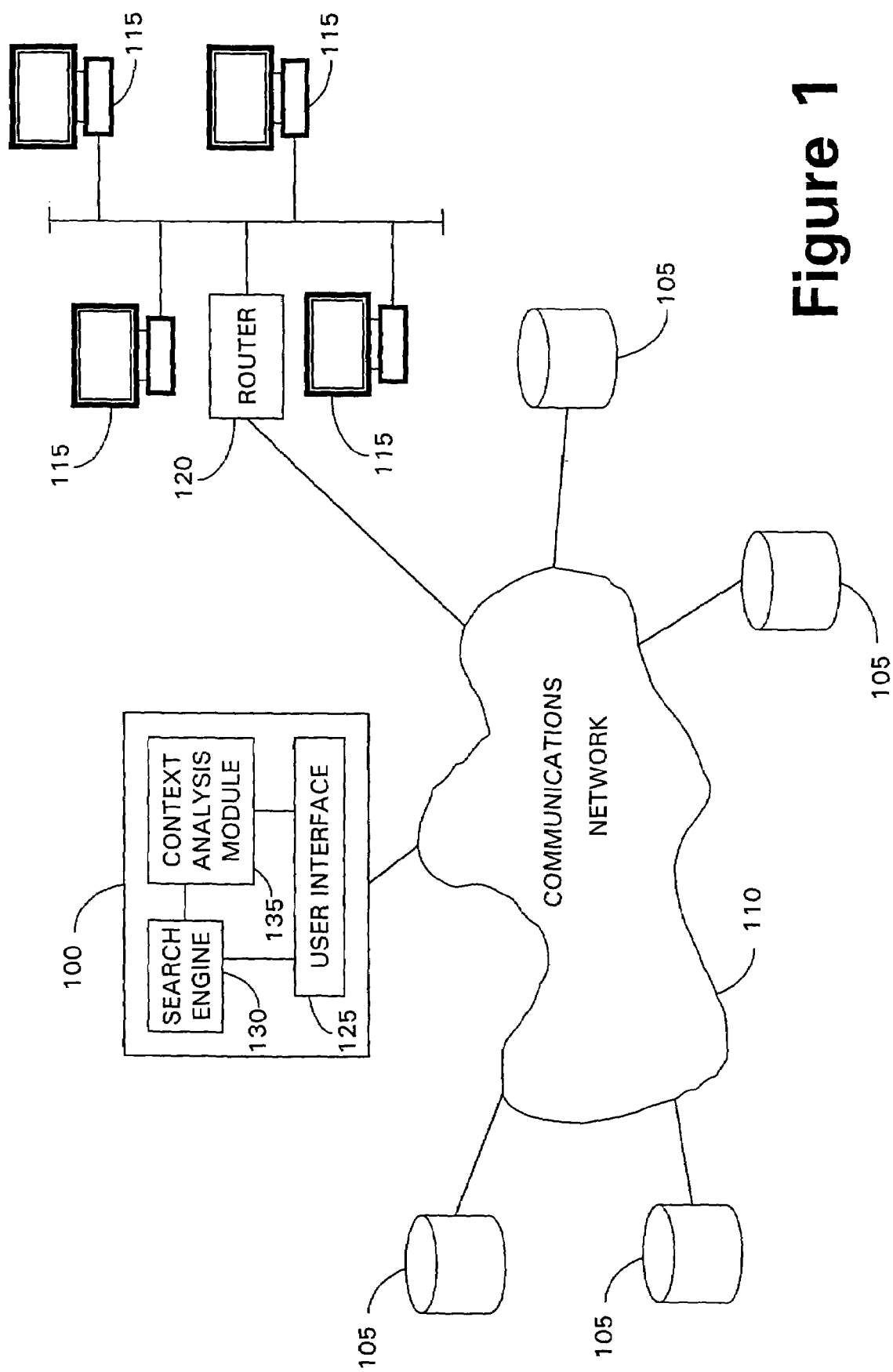
FIG. 1 is a diagram showing features of an information searching apparatus according to a preferred embodiment of the present invention.

Before describing a number of preferred embodiments of the present invention in detail, these embodiments will first be described in overview.

According to preferred embodiments of the present invention, apparatus and methods are provided to enable a user to locate and retrieve sets of information relevant to search criteria specified in a search query submitted by the user. In particular, as for all embodiments of the present invention, apparatus and methods are designed to enable the user to exploit contextual information provided within documents that have been annotated using a structured markup language such as XML. Besides locating portions of a document that appear to match the user's search criteria, embodiments of the present invention enable the user to use XML or other markup language tags, inserted into a document by the author, to help identify those documents from a potentially large set of search results that are most relevant to the original search query or, more particularly, to what the user hoped to find.

Embodiments of the present invention are largely concerned with analysis of search results, enabling a user to exploit contextual information provided by markup language annotations in documents identified in the search. Largely conventional search engines and search techniques may be used to obtain a set of search results on the basis of a user's search query. However, the otherwise conventional search engine or other information retrieval tool must be arranged to not only to locate portions of documents matching a user's search query, but also to identify and return annotating tags associated with those matching portions, according to the particular markup language used. In particular, the structure of annotating tags used in a particular structured markup language must be identified and returned in the search results, preserving that tag structure for analysis by novel and inventive features of the present invention, to be described in detail below.

Search results comprise a list of references to documents found by the search engine to have portions matching the search query, for example a list of document URLs if those documents are stored on web servers and accessible over the Internet, together with the respective tag structures associated with each of the matching portions. In each embodiment, the search results are presented to the user as a list of the identified tags and tag structures together with a list of the identified document references. For example, in a hierarchical tag structure such as that used with XML, the full structure of tags surrounding a matching portion of text will be presented in the tag list, with, optionally, a list of the lowest level tags.

In a first preferred embodiment of the present invention, a user is provided with apparatus having a user interface and facilities to enable the user to navigate through the returned set of search results making use of information provided by returned tags. In particular, a user may select one or more particular tags or tag structures from the tag list presented at the user interface and, in response to that selection, the apparatus will present at the user interface, from the set of document references, a list of only those documents containing the selected tags or tag structures associated with matching text. A user may have selected a particular tag because the words used in those tags were suggestive of a context relevant to the type of information the user was seeking. Now that the document list has been reduced the apparatus then adjusts the displayed tag list to include not only the selected tag or tags, but also any other tags and tag structures associated with matching text from the documents in the reduced list.

Identification of such additional tags may be highly relevant to the user because they may be suggestive of other contexts that might reveal relevant information, especially as those tags occurred in the same documents as the original tag selection. This so called "double filtering" technique may be extended by the user by making a further selection from the adjusted tag list and further restricting or otherwise altering the list of documents being investigated.

In a second embodiment, the apparatus provides an enhancement to the tag analysis process by using a thesaurus to identify different tags within the list that may have a similar meaning, or by using clustering techniques to identify tags that may relate to similar contexts. Such related tags may then be grouped together in the tag list presented at the user interface to enable a user to see that such tags may be so related and to providing the opportunity for the user to select the group of related tags rather than individual tags or tag structures in the "double filtering" navigation process outlined above.

In a third embodiment, the apparatus provides a further enhancement to the tag analysis process by monitoring, over a period of time, the selection of tags by users from each presented tag list and monitoring any subsequent access by a user of particular documents listed in the resultant reduced document lists. The apparatus records a history of tag selection by users in general, or by a particular user or group of users, and their subsequent document retrieval activity in respect of each distinct tag and/or tag structure. This historical data is then used to weight each of the distinct tags and tag structures according to likelihood that they resulted in a selection of documents relevant to those users. The apparatus is then able to present a given tag list in a ranking order of decreasing usefulness for example, when particular tags known from the historical records appear in a set of search results.

In a fourth embodiment, the apparatus is arranged, on the basis of previous document access by users, to establish a profile of the typical information content of portions of documents associated with each distinct tag and tag structure. Known document summarisers and key term extractors may be used to extract such profile information each time a document is accessed by a user. Typical information content of a given tag may then be made available to users as required. This helps to overcome problems in exploiting tags when lack of standardisation has resulted in different document authors using different tags or obscure choices of tag to represent the same or a similar context in particular fields of information.

DETAILED DESCRIPTION OF PREFERRED EMBODIMENTS

The now follows a more detailed description of preferred embodiments outlined above.

Referring to FIG. 1, an information retrieval apparatus 100 is shown according to preferred embodiments of the present invention, for use in searching for relevant information stored in file servers 105, web servers for example, and accessible over a communications network 110 such as the Internet. The information searching apparatus is arranged to receive search queries supplied by users from terminal equipment 115, typically submitted using a conventional browser product installed on a user's terminal equipment 115, a web browser for example, and transmitted over the communications network 105 by means of a router 120. The information searching apparatus 100 includes a user interface 125 for receiving search queries from users (115) and for returning search results to their terminal equipment 115, a search engine 130 and a context analysis module 135. Context analysis module 135 is arranged in particular to analyse and to present, via the user interface 125, XML tag information enclosing portions of documents that were found by the search engine 130 to match the search query, in a way that enables users to exploit the contextual information provided by those tags.

Steps in operation of an information searching apparatus 100 according to a first embodiment of the present invention will now be described with reference to FIG. 2.

Figure 2:
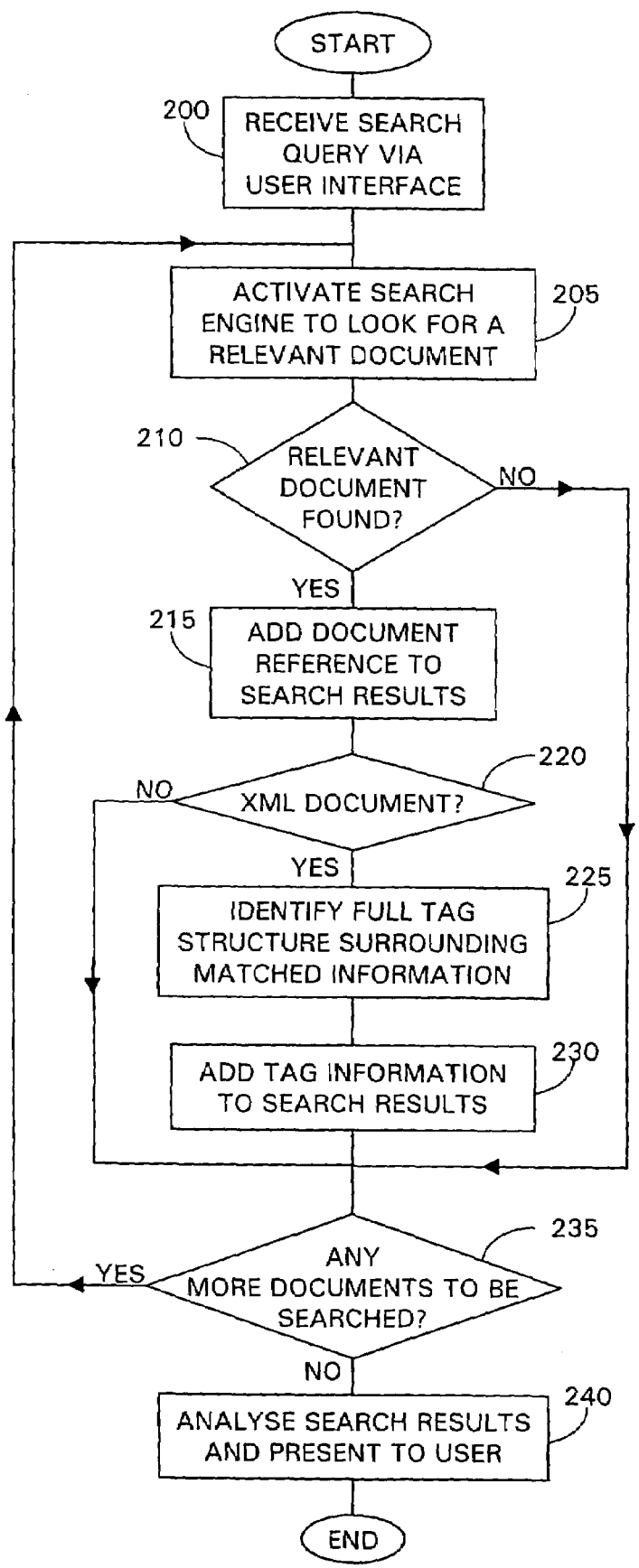
FIG. 2 is a flow chart showing steps in operation of an information searching apparatus according to a first embodiment of the present invention.

Referring to FIG. 2, processing begins at STEP 200 with receipt of a search query via the user interface 125. The search query specifies search criteria, such as a set of keywords or phrases, to be used in identifying potentially relevant sets of information. At STEP 205, the received search criteria are passed to the search engine 130 and the search engine 130 is activated to begin searching for relevant documents stored in file servers 105. Search engine 130 may be any one of a number of different types of known search engine arranged to use the supplied search criteria in any appropriate way to identify relevant information.

If a potentially relevant document is located by search engine 130, at STEP 210, then at STEP 215 a reference to the located document, for example a URL if the document is a web page located on a web server, is added to search results being compiled by the search engine 130. If, at STEP 220, the located document is an XML document, then at STEP 225 the located document is analysed to identify a full hierarchy of XML tags enclosing a portion of the located document containing relevant information. Preferably, search engine 130 may be adapted to carry out basic XML tag identification once it has established that the located document is an XML document. Alternatively, the context analysis module 135 may identify XML tags by direct access to a document identified by the search engine 130. Any identified XML tags are added to the search results at STEP 230, preserving the tag hierarchy. Processing then moves to STEP 235 to determine whether all accessible documents have been searched.

If, at STEP 220, the located document was not an XML document, or if at STEP 210 no relevant document was found, then processing proceeds directly to STEP 235 to determine whether all accessible documents have been searched.

At STEP 235, if all documents accessible to the search engine 130 have been searched, then at STEP 240 the compiled search results are passed to the context analysis module 135 for analysis and presentation to the initiating user via user interface 125. If documents remain to be searched at STEP 235, then processing returns to STEP 205 to continue the search for relevant information.

The context analysis module 135 may be arranged to provide a number of particularly useful functions, exploiting any contextual information provided by XML tags, to assist a user in navigating and selecting from a set of search results. Such functions are of particular use when search results contain a great many "hits" in response to a particular search query. Further embodiments of the present invention, to be described below, relate to the different levels of functionality that may be provided by the context analysis module 135.

According to the first embodiment of the present invention, context analysis module 135 provides a basic tag listing and grouping facility, accessible to users via the user interface 125, preserving and displaying a hierarchy of tags where more than one level of tagging was detected in a particular document. This enables search results to be grouped and selected by users for further examination according to tag group, the assumption being that tags of the same or a similar name are indicative of a similar information context. This basic tag listing and grouping function of context analysis module 135 will now be described with reference to FIG. 3.

Figure 3:
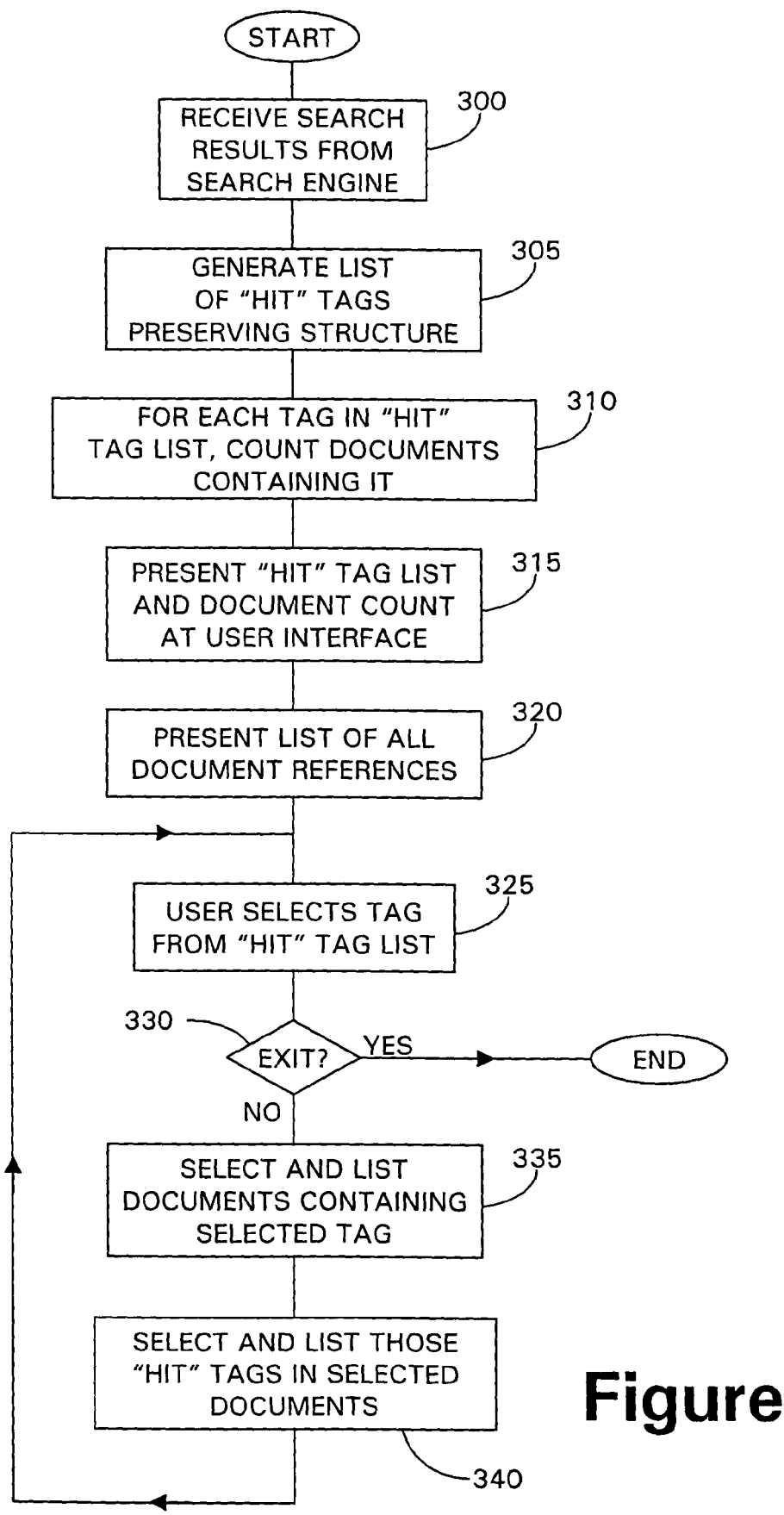
FIG. 3 is a flow diagram showing steps in operation of a context analysis module according to a first embodiment of the present invention.

Referring to FIG. 3, context analysis begins at STEP 300 with receipt from the search engine 130 of a set of search results. At STEP 305, all the XML tags identified in the search results are selected and an ordered list of XML tags is generated, preserving the hierarchical structure of tags where there is more than one level enclosing a relevant section of a document. At STEP 310, for each distinctly named tag and tag hierarchy, a count is made of the number of document references from the search results in which the same tag or tag hierarchy was identified. At STEP 315, the ordered tag list and associated document count is presented to the originating user via the user interface 125. At STEP 320, in addition to the tag list, a list of all the identified document references is also presented via the user interface 125 in a conventional format, for example including a document address or other reference together with, if enabled, a precis of the relevant section of each document.

At STEP 325, the context analysis module 135 is arranged to accept, via the user interface 125, user selection of any tag or group of tags from the displayed tag list, or selection of an option to exit. If the user does not want to exit, at STEP 330, then at STEP 335 the list of document references is adjusted to show references for only those documents in which one or more of the selected tags were found by the search engine 130. So, for example, if there were found at STEP 310 to be 17 documents in which a relevant portion was contained within an XML tag <PRODUCT_TYPE>, then if <PRODUCT_TYPE> were selected from the tag list at STEP 325, the user would then see at STEP 335 those 17 document references listed via the user interface.

Having presented the adjusted list of document references at STEP 335, the tag list itself is then adjusted at STEP 340 to display only those tags identified in those documents referenced in the adjusted document list. This adjustment to the tag list may bring in extra tags that were not selected at STEP 325 because in one or more of the documents containing the selected tag(s), the search engine 130 may have identified more than one potentially relevant portion, each portion being enclosed by different tags. This additional tag information can be very useful when navigating through the search results because the adjusted tag list is more likely to contain tags related in context (at least from the point of view of the user submitting the original search query) given that they occurred within documents located using the same search query. When processing returns to STEP 325 the user may select one or more of those additional tags and hence, at STEP 335, identify and view any further documents containing potentially relevant portions in the context of those additional tags.

In this way, a user may use the tag list to "drill-down" to those documents most likely to contain relevant information by navigating through tags that appear to suggest the most relevant context. Adjustment of the listed document references and, in response, to the listed tags to correspond to the listed documents, provides a double filtering mechanism that is particularly effective in helping a user to navigate through search results and select a potentially relevant subset of documents for further investigation, making full use of contextual information provided by XML tags.

At any stage, a user may expand analysis of the search results by restoring the full list of displayed tags and selecting another starting point.

Further basic sorting facilities may be provided by the context analysis module 135 according to the first embodiment. In particular, a so called "stop list" may be used by the context analysis module 135 to eliminate particularly basic XML tags from consideration and display in a tag list. Such tags might include <CHAPTER>, <SECTION>, <PARAGRAPH>, <WORDS> and other such tags that provide only structural information about the layout of a document and little about the informational context of a portion identified by the search engine 130. However, tags such as <SUMMARY> or <PRECIS> provide useful information about the context, within the document, of a matching word or phrase, suggesting that the matching word or phrase is more likely to be indicative of the primary information content of the document as a whole. Whether stop lists are used in relation to a particular information search is preferably an option selectable by a user via the user interface 125.

According to a second preferred embodiment of the present invention, there is provided and an apparatus and method for enhancing the analysis and interpretation of tags and tags structures returned in search results to assist a user in recognising groups of tags having a similar meaning or relating to a similar context.

XML tags in particular are simply words. Aside from those that are standardised for XML itself, different words may be used in different XML implementations to mean largely the same thing. One author might tag part of a document as <summary> while another might tag the same part of another document as <precis>; or a section of one document might be about software agents and tagged <agents> while in another document the same tag is used to tag a section about estate agents.

According to the second preferred embodiment of the present invention, the context analysis module 135 is provided with access to a thesaurus for use in identifying synonyms and helping to disambiguate tags. A general purpose thesaurus may be used, for example one such as WordNet, as disclosed in "WordNet: An Electronic Lexical Database", edited by Christiane Fellbaum, MIT Press, May 1998., or, for more specialised information searches, a ready-made domain-specific thesaurus may be accessed, or even created using a clustering technique—see below.

Preferably, in presenting search results using tags lists as described above with reference to FIG. 3, the context analysis module 135 may present tags in a list along with identified synonyms from the thesaurus to help clarify the context of the tag. Alternatively, tags found to be related in meaning, following reference to the thesaurus, may be grouped together in the presented tag list to enable a user to select the whole group when narrowing down the list of documents to be investigated.

In addition, or alternatively to the use of a thesaurus, clustering techniques such as those disclosed in "Clustering Algorithms", Rasmussen, E., in "Information Retrieval: Data Structures and Algorithms", edited by Frakes, W. & Baeza-Yates, R.,Prentice-Hall, New Jersey, USA, 1992, may be used to identify tags having a similar meaning or used in a similar context in the returned search results.

A numerical value representative of a measure of the contextual 'similarity' of a pair of tags Ti and Tj returned in the search results, may be calculated as:

$$2*[Ti \cap Tj]/[Ti]+[Tj]$$

where [Ti] and [Tj] are the number of documents in the search results in which tags Ti and Tj respectively were identified in relation to relevant information, and

[Ti∩Tj] is the number of documents in which Ti and Tj co-occur. This measure of similarity takes a value between 0 and 1, with 0 meaning that the tags share no similarity of context (no documents contain both the tags) and 1 meaning that all documents in the search results contain both the tags and hence that the two tags are likely to have been used in the same information context.

A matrix of values for the above measure of context similarity is calculated for the tags and tag structures returned in a given set of search results. This matrix may then be used to identify groups of tags that may be related in context, for example by identifying a set of tags for which each combination of two tags selected from the set has a value of the similarity measure exceeding a predetermined threshold. The most similar tags may then be presented in groups for selection by a user in the tag list.

According to a third preferred embodiment of the present invention there is provided an apparatus and method for monitoring tag selection and associated document access by individual users or by predetermined groups of users as the basis for weighting and ranking distinct tags. Weightings may represent the probability that a given tag or tag structure will result in a selection of documents from the search results that contains documents of relevance to the particular user or group of users.

The apparatus of the third embodiment is provided with an information access monitor for monitoring selection of tags and access to referenced documents by users. The information retrieval monitor is arranged with access to the user interface 125 to monitor all tag selections by users and any requests by users to access documents included in corresponding lists. The monitor also includes a store for recording history of selection for each distinct tag and tag structure and for recording weightings calculated in respect of each tag.

Each time a user selects a tag from a tag list presented at the user interface 125, the monitor checks for an entry in the store for that particular tag. If not, then an entry is created for the tag. If necessary, certain "low value" words may be removed from the stored tag, or words may be stemmed to render them into a more standardised form. For each tag, a counter is maintained both for the number of times that selection of the tag was selected and for the number of times that selection of the tag was followed by an access request by the user for a document listed in the resultant reduced document list (see STEPs 325 and 335 of FIG. 3). These counters may then be used to calculate, for each tag, a weighting representing a measure of the probability that selection of the tag results in a list containing relevant documents for that user.

The monitor may be further enhanced to monitor the duration of a document access by a user, providing further information on the relevance of the accesses document to the user. Longer duration access to documents may trigger a double increment, for example, of the second of the two counters mentioned above.

Operation of the information retrieval monitor described above may be triggered each time a new set of results is returned in response to a search query and the initial tag list is presented at the user interface 125. Weightings may be recalculated each time a user accesses a document so that they are immediately available for use in ranking each presented tag list.

In an alternative ranking method, a user profile of keywords or terms may be stored in respect of each user of the apparatus. Such a profile may be used to represent the interests of a user and particularly contextual information of relevance to that user's interests. A known measure of relevance may be calculated for each tag in a tag list with respect to the words and terms in the user profile. The measure of relevance may be used to rank the tags in the list in order of relevance to the user profile as a further assistance to a user in selecting tags most likely to result in an efficient navigation of a set of search results leading to a list of the most relevant documents from the search.

According to a fourth preferred embodiment, known document summarisers and key term extractors may be used to accumulate a profile of information content typically associated with each of a set of distinct tags, for example the tags stored by the information retrieval monitor of the third embodiment described above.

Each time a user accesses a particular document, key terms indicative of the information content of the matching portion of that document may be extracted and stored in association with the particular tag selection that preceded access of that document. Such terms may be further summarised to build up a profile of a tag for presentation to users as required. This feature provides further assistance to users in understanding the intended meaning of a tag, particularly in the absence of standardised use of tags.

What is claimed is:

1. A method of accessing sets of information stored in an information system, wherein portions of said sets of information are enclosed by tags of a hierarchical tag structure defined according to a structured mark-up language, the method comprising the steps of:
   (i) generating a search query comprising user-specified search criteria;
   (ii) searching the sets of information using the user-specified search criteria and identifying portions of said sets of information matching said specified search criteria, and outputting a list of references to said identified sets of information;
   (iii) identifying, for each matching portion identified at step (ii), an enclosing tag structure and outputting a list of said identified tag structures;
   (iv) receiving a user-selection specifying a tag structure from the list output at step (iii);
   (v) adjusting said list of references from step (ii) to comprise references only to said identified sets of information that contain the tag structure selected at step (iv);
   (vi) adjusting said list of tag structures to comprise tag structures contained in information sets referenced in said adjusted list at step (v); and
   (vii) repeating step (iv) in respect of said adjusted list of tag structures, and step (v) to identify a more specific list of references to sets of information.

2. A method according to claim 1, wherein step (iii) further includes identifying, using a thesaurus, groups of two or more of said tag structures containing tags having a similar meaning, and wherein at step (iv), selecting a tag structure includes selecting one of said groups of tag structures.

3. A method according to claim 1, including the steps of:
   (viii) detecting, following receipt of the selection signal at step (iv), a request for access to a corresponding set of information listed in step (v);
   (ix) updating, in respect of the tag structure selected at step (iv), a weighting value representative of the probability that selection of the tag structure led to a request for access to a corresponding set of information; and
   (x) outputting an ordered list of the tag structures identified at step (iii) according to their respective weighting values.

4. An information retrieval apparatus for accessing sets of information stored in an information system, wherein portions of said sets of information are enclosed by tags of a hierarchical tag structure defined according to a structured mark-up language, the apparatus comprising:
   a search engine which:
   (i) generates a search query comprising user-specified search criteria;
   (ii) searches the sets of information using the user-specified search criteria and identifies portions of said sets of information corresponding to said specified search criteria, and outputs a list of references to said identified sets of information; and
   a context analysis module which:

(iii) identifies, for each corresponding portion identified at step (ii), an enclosing tag structure and outputs a list of said identified tag structures;

(iv) receives a user-selection specifying a tag structure from the list output at step (iii);

(v) adjusts the list of references from step (ii) to comprise references only to said identified sets of information that contain the tag structure selected at step (iv);

(vi) adjusts said list of tag structures to comprise tag structures contained in information sets referenced in said adjusted list at step (v); and (vii) repeats step (iv) in respect of said adjusted list of tag structures, and step (v) to identify a more specific list of references to sets of information.

5. The apparatus according to claim 4, wherein, in step (iii), the context analysis module identifies, using a thesaurus, groups of two or more of said tag structures containing tags having a similar meaning, and wherein, at step (iv), the context analysis module selects a tag structure including selecting one of said groups of tag structures.

6. The apparatus according to claim 4, further comprising an information access monitor which:

(viii) detects, following receipt of the selection signal at step (iv), a request for access to a corresponding set of information listed in step (v);

(ix) updates, in respect of the tag structure selected at step (iv), a weighting value representative of the probability that selection of the tag structure led to a request for access to a corresponding set of information; and (x) outputs an ordered list of the tag structures identified at step (iii) according to their respective weighting values.

* * * * *